No. 868,692. PATENTED OCT. 22, 1907.
I. OTIS.
MILK PAIL HOLDER.
APPLICATION FILED AUG. 5, 1907.
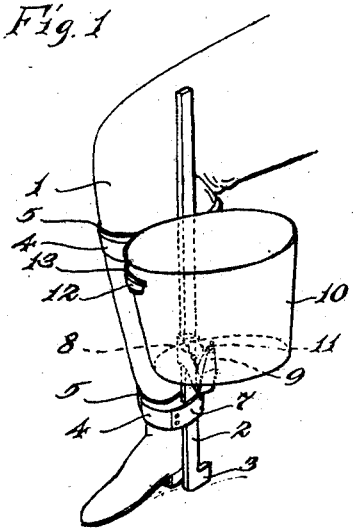
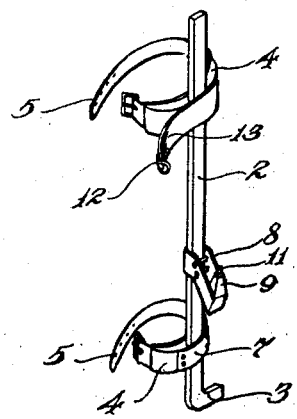
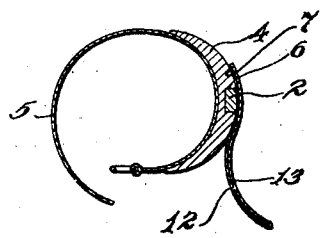
Witnesses:
L. L. Simpson
A. H. Opsahl.
Inventor:
Ivah Otis.
By his Attorneys
Williamson Merchant

UNITED STATES PATENT OFFICE.

IVAH OTIS, OF MARSHALL, MINNESOTA.

MILK-PAIL HOLDER.

No. 868,692.  Specification of Letters Patent.  Patented Oct. 22, 1907.

Application filed August 5, 1907. Serial No. 387,163.

*To all whom it may concern:*

Be it known that I, IVAH OTIS, a citizen of the United States, residing at Marshall, in the county of Lyon and State of Minnesota, have invented certain new and useful Improvements in Milk-Pail Holders; and I do hereby declare the following to be a full, clear, and exact description of the invention, such as will enable others skilled in the art to which it appertains to make and use the same.

My invention has for its object to provide an improved milk pail holder, and to this end it consists of the novel devices and combinations of devices hereinafter described and defined in the claims.

In the accompanying drawings, which illustrate the invention, like characters indicate like parts throughout the several views.

Referring to the drawings; Figure 1 is a perspective view showing the improved milk pail holder attached to the lower portion of the leg and supporting a milk pail. Fig. 2 is a perspective view of the improved milk pail holder; and Fig. 3 is a horizontal section taken through the upper segmental leg socket.

The numeral 1 indicates the lower portion of a person's leg, having attached thereto my improved milk pail holder. For the purpose of illustrating my invention, but one of the devices is shown, but, of course, in actual practice, each leg of the person will be equipped with one of the said devices. Each device consists of an upright supporting bar 2, the lower end of which is bent laterally to form a base 3 for engagement with the ground.

A pair of segmental leg sockets is indicated by the numeral 4, to which are secured buckle-equipped straps 5 for securing said leg sockets 4 to the leg of a person. One of said segmental leg sockets 4 is adapted to fit the leg just above the ankle, and the other to fit below the knee. In the outer face of each segmental leg socket 4 is cut a notch 6, through which the supporting bar 2 is adapted to slide. For securing the supporting bar 2 against lateral movement within the notches 6, segmental metallic plates 7 extend across the said notches 6, and are rigidly secured by screws, or otherwise, to the segmental leg sockets 4. The supporting bar 2 is in cross section of such width as to tightly fit within the notches 6 so that the said supporting bar may be held by friction in any desired set position.

Mounted to slide frictionally on the supporting bar 2, between the upper and lower segmental leg sockets 4, is a rest bracket 8 provided with an upwardly and outwardly extending lug 9 on which the bottom of a milk pail 10 rests. As shown, said lug 9 has secured to its upper end a piece of soft metal or rubber 11 to prevent said lug 9 from scratching the pail 10. To support the pail 10 near its top, the upper segmental plate 7 is provided with an outwardly and forwardly extended arm 12, said plate 7 and arm 12 being provided with a facing 13 to prevent scratching the pail 10.

The person engaged in milking naturally sits in such a position that the supporting bars 2, secured to the lower portion of his legs, will stand at an angle with respect to the ground and project away from the person, in which position the pail 10 supported thereby will also stand at the same angle, resting upon the lugs 8 and arm extensions 12. The supporting bars 2 normally rest upon the ground and support the entire weight of the pail 10. The said pail 10 may be supported at the desired elevation by simply sliding the rest brackets 8 up or down upon the supporting bars 2. The rest brackets 8 will be held wherever set by frictional clamping engagement with said supporting bars 2. As is evident, the greater the weight of the pail, the more securely will the rest brackets be clamped to the supporting bars. When moving around, to prevent the lower portion of the device from coming into contact with the ground, the supporting bar 2 may be slid upward through the notches 6.

The device just described, while of comparatively small cost, is thought to be very efficient for the purpose had in view.

What I claim is:

1. In a milk pail holder, the combination with a supporting bar, of a rest bracket adjustably supported therefrom, means for connecting said supporting bar to the leg of a person, and a pail clamp carried by said supporting bar, substantially as described.

2. In a milk pail holder, the combination with a supporting bar, of a rest bracket adjustably supported therefrom, a leg strap attached to said supporting bar for connecting the same to the leg of a person, and a pail clamp carried by said supporting bar, substantially as described.

3. In a milk pail holder, the combination with a supporting bar, of a rest bracket mounted for sliding movement thereon and adapted to be held by friction in different positions, leg sockets through which said supporting bars are adapted to slide, leg straps secured to said leg sockets for connecting the same to the leg of a person, and a pail clamp carried by one of said leg sockets, substantially as described.

4. In a milk pail holder, the combination with a supporting bar, of a rest bracket mounted for sliding movement thereon and adapted to be held by friction in different set positions, leg sockets through which said supporting bars are adapted to slide, leg straps secured to said leg sockets for connecting the same to the leg of a person, and a pail clamp carried by the upper leg socket, substantially as described.

In testimony whereof I affix my signature in presence of two witnesses.

IVAH OTIS.

Witnesses:
O. E. GAIL,
MARIE OTIS.